(12) United States Patent
Zhang et al.

(10) Patent No.: US 9,660,823 B2
(45) Date of Patent: May 23, 2017

(54) SHARED PRESENTING METHOD AND SYSTEM

(71) Applicants: Beijing Kingsoft Office Software, Inc, Beijing (CN); ZHUHAI KINGSOFT OFFICE SOFTWARE CO., LTD, Zhuhai (CN)

(72) Inventors: Qingyuan Zhang, Zhuhai (CN); Hui Wang, Zhuhai (CN)

(73) Assignees: BEIJING KINGSOFT OFFICE SOFTWARE, INC, Beijing (CN); ZHUHAI KINGSOFT OFFICE SOFTWARE CO., LTD, Zhuhai (CN)

( * ) Notice: Subject to any disclaimer, the term of this patent is extended or adjusted under 35 U.S.C. 154(b) by 0 days.

(21) Appl. No.: 14/366,675

(22) PCT Filed: Mar. 15, 2013

(86) PCT No.: PCT/CN2013/072663
§ 371 (c)(1),
(2) Date: Jun. 19, 2014

(87) PCT Pub. No.: WO2014/005439
PCT Pub. Date: Jan. 9, 2014

(65) Prior Publication Data
US 2015/0127732 A1    May 7, 2015

(30) Foreign Application Priority Data
Jul. 5, 2012    (CN) .......................... 2012 1 0232573

(51) Int. Cl.
*G06F 15/16*    (2006.01)
*H04L 12/18*    (2006.01)
*H04L 29/08*    (2006.01)

(52) U.S. Cl.
CPC ...... *H04L 12/1822* (2013.01); *H04L 12/1818* (2013.01); *H04L 67/1095* (2013.01)

(58) Field of Classification Search
CPC ............. H04L 12/1818; H04L 12/1822; H04L 67/1095
(Continued)

(56) References Cited

U.S. PATENT DOCUMENTS

2003/0172033 A1    9/2003    Risan et al.
2007/0265970 A1*   11/2007   Kahn .................... H04N 7/162
                                                                705/52
(Continued)

FOREIGN PATENT DOCUMENTS

CN    101034960 A    9/2007
CN    101102211 A    1/2008
(Continued)

OTHER PUBLICATIONS

International Search Report for PCT/CN2013/072663.

*Primary Examiner* — Normin Abedin
(74) *Attorney, Agent, or Firm* — Kilpatrick Townsend & Stockton LLP

(57) ABSTRACT

The present invention provides a shared presenting method and system, in said shared presenting method: an initiator sets up a shared presentation room and sends invitation information of said shared presentation room via a network; a receiver that receives said invitation information joins in said shared presentation room through establishing a network connection; said initiator sends a presenting file and a playing control instruction for said presenting file to said receiver that has joined in said shared presentation room; said receiver receives said presenting file and said playing control instruction, and locally executes a playing control operation to said presenting file in accordance with said playing control instruction. Said mobile device comprises (Continued)

said shared presenting system. The shared presenting method and system provided by the present invention can present a presentation file among a plurality of mobile devices simultaneously.

7 Claims, 2 Drawing Sheets

(58) Field of Classification Search
USPC .......................................................... 709/204
See application file for complete search history.

(56) References Cited

U.S. PATENT DOCUMENTS

| | | | |
|---|---|---|---|
| 2008/0133736 A1* | 6/2008 | Wensley | ................ G06Q 10/10 709/224 |
| 2011/0179115 A1* | 7/2011 | Castro | ............... G06F 17/30867 709/204 |
| 2013/0301953 A1* | 11/2013 | Montague | .......... G06Q 30/0241 382/276 |

FOREIGN PATENT DOCUMENTS

| | | | |
|---|---|---|---|
| CN | 101150537 | A | 3/2008 |
| CN | 101562735 | A | 10/2009 |
| CN | 101834905 | A | 9/2010 |
| CN | 101909045 | A | 12/2010 |
| CN | 102739801 | A | 10/2012 |
| KR | 1020110075136 | A | 7/2011 |
| WO | 03050699 | A1 | 6/2003 |

\* cited by examiner

SHARED PRESENTING METHOD AND SYSTEM

This application is a US National Stage of International Application No. PCT/CN2013/072663, filed Mar. 15, 2013, designating the United States, and claiming priority to Chinese Patent Application No. 201210232573.8, filed with the State Intellectual Property Office of China on Jul. 5, 2012 and entitled "Shared Presenting Method and System", which is hereby incorporated by reference in its entirety.

TECHNICAL FIELD

The present invention relates to the technical field of playing file, and particularly to a shared presenting method and a shared presenting system.

BACKGROUND OF THE INVENTION

With the development and increasingly widespread use of mobile processing devices such as smartphones and Tablet PCs, there has been software dedicated for mobile devices for opening presentation files. Currently, when a user needs to display a presentation file during a conference, the user can only play a slide film with a PC or projector, while conference participants cannot participate with their own mobile devices. Thus, it is inconvenient for participation.

To enable mobile devices of conference participants to participate in playing of a presentation file used in the conference, the presentation file is usually sent to every mobile device of the conference participants respectively and is then opened in each mobile device to play said presentation file respectively.

However, playing a presentation file in such a manner cannot achieve the effect of conference, that is, the presentation file played by every mobile device of the conference participants are out-of-sync, and operations performed to the presentation file by every conference participant, such as turning a page or pulling down, can only be retailed to other conference participants orally, which is inconvenient.

DISCLOSURE OF THE INVENTION

Technical Problem

With regard to the aforesaid problem in the prior art, the purpose of the present invention is to provide a shared presenting method, wherein content of the same presentation file is displayed in every mobile device of conference participants synchronously through sharing typesetting data for generating a display picture of an initiator, thereby achieving the effect of synchronous playing and displaying in the mobile devices of conference participants. The purpose of the present invention is to further provide a shared presenting system for implementing said method.

Technical Solution

A shared presenting method, in which, an initiator sets up a shared presentation room and sends invitation information of said shared presentation room via a network; a receiver that has received said invitation information joins in said shared presentation room through establishing a network connection; said initiator sends a presenting file and a playing control instruction for said presenting file to said receiver that has joined in said shared presentation room; said receiver receives said presenting file and said playing control instruction, and locally executes a playing control operation to said presenting file in accordance with said playing control instruction at the receiver.

A shared presenting system, comprising an initiator plug-in and a receiver plug-in; said initiator plug-in is used for setting up a shared presentation room, sending invitation information of said shared presentation room via a network and sending a presenting file and a playing control instruction for said presenting file to a receiver plug-in that has joined in said shared presentation room; said receiver plug-in is used for receiving said invitation information, joining in said shared presentation room through establishing a network connection, receiving said presenting file and said playing control instruction, and executing a playing control operation to said presenting file in accordance with said playing control instruction at the receiver locally.

Beneficial Effect

As compared with the prior art, the shared presenting method and system can control a playing control operation performed to a presentation file by each receiver through setting up a shared presentation room among a plurality of mobile devices via a network, wherein an initiator sends a presenting file and a playing control instruction for said presenting file to a receiver plug-in that has joined in said shared presentation room, which is of great convenience.

SPECIFIC MODES OF CARRYING OUT THE PRESENT INVENTION

Figure 1:
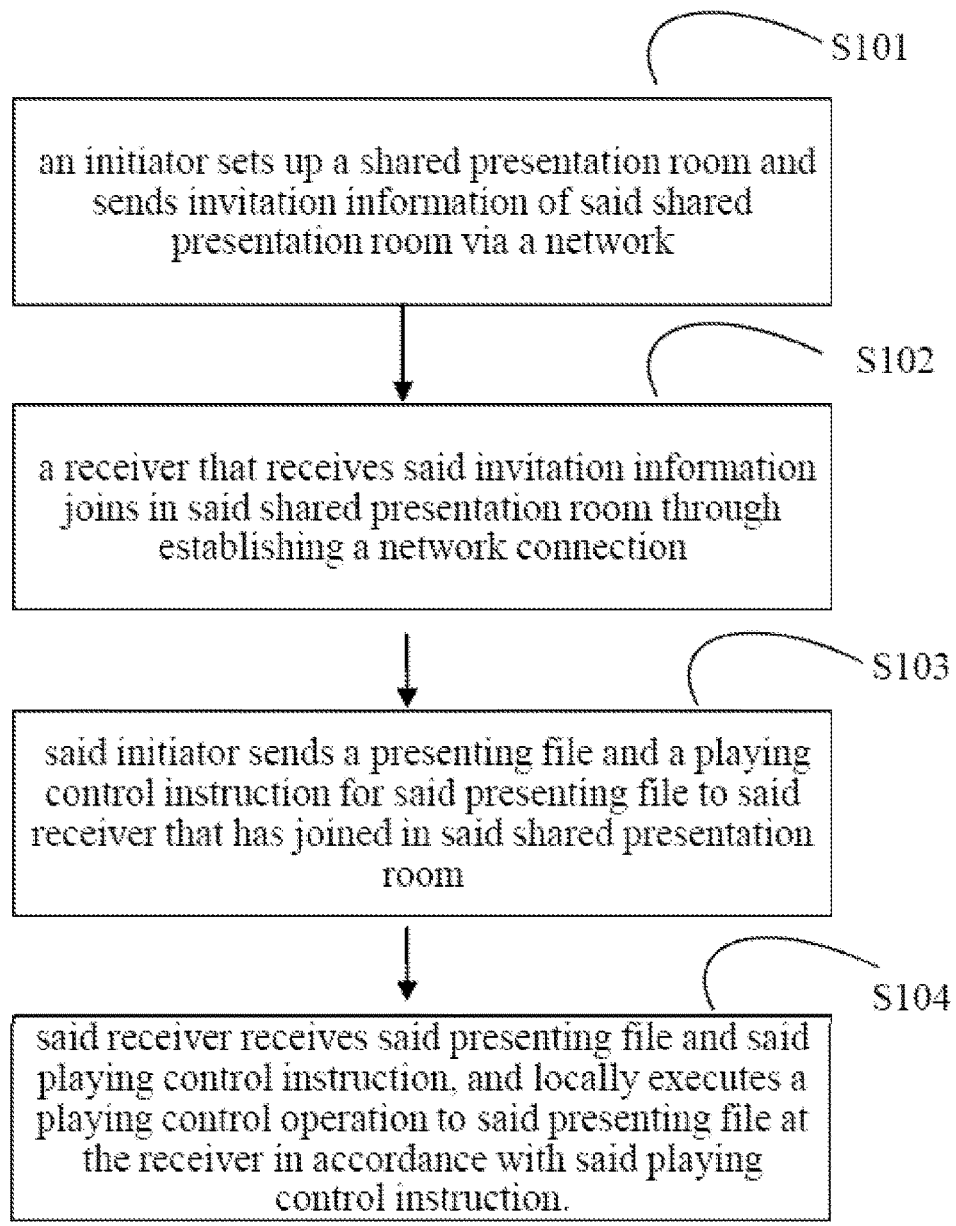
FIG. 1 is a flow chart of a shared presenting method according to the present invention.

Referring to FIG. 1, which is a flow chart of a shared presenting method according to the present invention.

The shared presenting method comprises the following steps: Step S101, an initiator sets up a shared presentation room and sends invitation information of said shared presentation room via a network.

In the present invention, said initiator is usually a mobile device having a playing material such as a presentation file and being ready to provide a uniform playing picture for sharing by other mobile devices, which is usually a mobile device of a conference host; and a receiver is usually a mobile device of a conference participant ready to receive picture data shared by said initiator. These mobile devices can be handheld devices such as smart phones, or other processing devices capable of playing a presentation file, wherein there are usually one initiator and one or more receivers.

Said shared presentation room is a virtual presentation room established between two or more mobile devices via a network interconnection within a certain range, which is set up by a device acting as the initiator and authorized by said initiator to allow participation of other devices. The initiator and receiver(s) in said shared presentation room can connect with each other in a point to multipoint network connection manner or a multipoint interconnect network connection manner.

In this step, said initiator can send invitation information of said shared presentation room to other mobile devices within a certain distance by means of network communication such as Wi-Fi. In an embodiment, the invitation information of said shared presentation room includes an IP address of said initiator, each of said receivers establishes a network connection with said initiator in accordance with the IP address in said invitation information and joins in said shared presentation room.

Step S102: a receiver that receives said invitation information joins in said shared presentation room through establishing a network connection.

Any mobile device within the coverage range of the invitation information of said shared presentation room can act as a receiver. Upon receiving the invitation information sent by said initiator, a receiver can select to join in or not to join in said shared presentation room based on said invitation information; a receiver, if selecting to join in said shared presentation room, joins in the network interconnection of said shared presentation room through establishing a network connection.

In an embodiment, said initiator can preset an authorization key of said shared presentation room when initiating said shared presentation room invitation, and require a receiver intending to join in said shared presentation room to input the authorization key for confirmation.

Said receiver sends the authorization key of said shared presentation room to said initiator; said initiator receives the authorization key sent by said receiver and compares it with the preset authorization key, and makes a receiver having a consistent authorization key to join into said shared presentation room.

By means of setting an authorization key, only when said receiver inputs a correct and consistent authorization key, corresponding said receiver is allowed to join in said shared presentation room. In this way, the confidentiality of the presenting content in the shared presentation room can be enhanced by preventing irrelevant people from joining in the shared presentation room to steal the presenting content after receiving the invitation information.

In an embodiment, said initiator can transmit said IP address or authorization key in the manner of Morse codes through sound. Thus, only a mobile device that has received said sound signal and has the capability of decoding Morse codes can access said shared presentation room. Wherein, said Morse code is a type of on-and-off signal code which indicates different alphabets, numbers and punctuations through different arranging sequences. It can prevent illegal access by people irrelevant to the conference and ensure the privacy of the conference.

Furthermore, after each of said receivers joins in said shared presentation room, said initiator can create an address list including an IP address of said initiator and IP addresses of each receivers, said initiator and said receivers can perform data transmission by searching for an address in said address list. By creating said address list, communication between the initiator and the receivers can be realized conveniently and communication among the receivers can be realized conveniently, too.

Step S103: said initiator sends a presenting file and a playing control instruction for said presenting file to said receiver that has joined in said shared presentation room.

When sending said presenting file, said initiator can send said presenting file to all of said receivers that have joined in said shared presentation room simultaneously in a broadcast manner; or send said presenting file to each of said receivers through a network connection established with each of said receivers respectively.

Wherein said playing control instruction is preferably identical with a local operation of said initiator.

That is, said initiator generates a corresponding playing control instruction in accordance with a playing control operation performed to said presenting file at the initiator locally and sends said playing control instruction to said receivers that have joined in said shared presentation room.

Thus, each of the receivers can execute a completely identical operation with said initiator in accordance with said playing control instruction, thereby realizing synchronization of operation.

Step S104: said receiver receives said presenting file and said playing control instruction, and locally executes a playing control operation to said presenting file at the receiver in accordance with said playing control instruction.

In this step, each receiver that has joined in said shared presentation room receives said presenting file sent by said initiator, stores said presenting file locally, opens said presenting file locally with a corresponding application program and executes a corresponding playing control operation to said presenting file in accordance with said received playing control instruction, thereby realizing an initiator controlling a plurality of receivers to present a uniform presenting file.

In step S103, since the presenting file per se is sent, thus, each receiver has actually obtained said presenting file and can store said presenting file. Transmission of said presenting file is required only once. After the receivers have received said presenting file, only a playing control instruction of a small amount of data needs to be sent to each receiver in the presenting course, and each receiver executes a corresponding operation in accordance with said playing control instruction, thereby greatly reducing the amount of data transmitted during the presenting course.

As compared with the prior art, the shared presenting method of the present invention can control a playing control operation performed to a presentation file by each receiver through setting up a shared presentation room among a plurality of mobile devices via a network, wherein an initiator sends a presenting file and a playing control instruction for said presenting file to a receiver plug-in that has joined in said shared presentation room, which is of great convenience.

As a preferred embodiment of the shared presenting method of the present invention, in which:

said receivers, upon detection of a local marking operation to said presenting file, sends information of said marking operation to said initiator;

said initiator further executes a marking operation to said presenting file in accordance with a local marking operation by the initiator or the received information of marking operation sent by said receiver, generates a corresponding marking operation instruction, and sends said marking operation instruction to the receivers that have joined in said shared presentation room; each of said receivers receives said marking operation instruction and executes a marking operation to said presenting file.

wherein, the user of said initiator or the user of a receiver can execute a marking operation in the local device of the initiator or the local device of the receiver by using various touch-sensitive systems or a laser pointer, etc.

That is, if the receiver detects a marking operation by a local user when playing said presenting file, then the receiver sends information of said marking operation to said initiator. Said receiver can calculate a position of said marking operation in said presenting file based on a position of said marking operation and a position of the presenting file that is locally played, and then send said position and a type of said marking operation together to said initiator, wherein, the type of the marking operation can be known editing and marking operations to a file, such as drawing a straight line, a curve, adding bold or italic etc.

Said initiator, upon receiving said marking operation or upon detecting a local marking operation at the initiator, executes a corresponding marking operation to said presenting file in accordance with the position and type of said marking operation, generates a corresponding marking operation instruction, and sends said marking operation instruction to said receivers that have joined in said shared presentation room; each of the receivers receives said marking operation instruction, executes a marking operation to said presenting file and add a corresponding mark into said presenting file. Adding of said marking operation can be performed in the revise mode, or said marking operation is added into said presenting file in the form of a comment.

Preferably, said initiator further adds an identifier of the device that has initiated said marking operation in said marking operation instruction. Said initiator and each of the receivers further execute a marking operation to said presenting file with different colors in accordance with different device identifiers when executing a marking operation to said presenting file so as to clearly distinguish markings of different operators via marks of different colors.

With the shared presenting method of the present invention, marking information of operators is shared in the meanwhile when sharing a playing file. When an operator of said initiator or receivers perform marking to the current presenting file and wishes to show the marking to other participants, he/she can easily share said marking operation between said initiator and said receivers. Since each of the receivers performs marking to the presenting file respectively, said marking can be stored by the receivers at the end of the presenting to facilitate reviewing by users of the receivers.

As another preferred embodiment, said initiator further sends a synchronization signal to said receivers that have joined in said shared presentation room; each of the receivers receives said synchronization signal and executes a playing control operation to said presenting file synchronously in accordance with said synchronization signal.

Through said synchronization signal, said initiator and said receivers can execute a corresponding playing control operation synchronously, thereby avoiding the problem of playing out-of-sync among the mobile devices caused by instruction transmission and delay.

Figure 2:
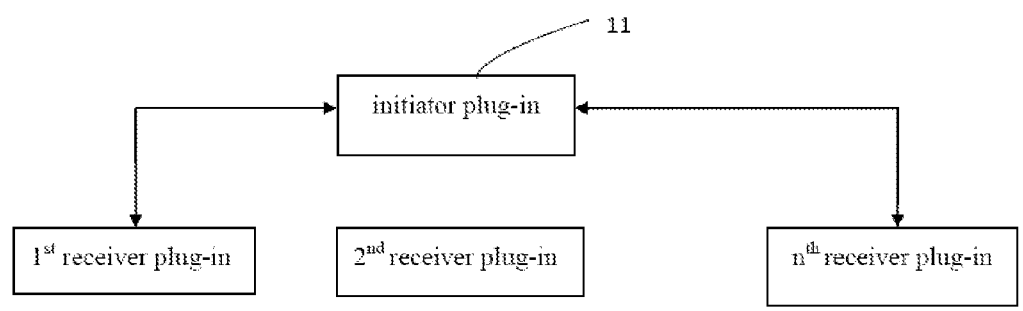
FIG. 2 is an illustration of the structure of a shared presenting system according to the present invention.

Referring to FIG. 2, which is an illustration of the structure of a shared presenting system according to the present invention.

Said shared presenting system comprises: an receiver plug-in 11 and receiver plug-ins 12.

Said initiator plug-in 11 is used for setting up a shared presentation room, sending invitation information of said shared presentation room via a network and sending a presenting file and a playing control instruction for said presenting file to receiver plug-in 12 that has joined in said shared presentation room.

Said receiver plug-in 12 is used for receiving said invitation information, joining in said shared presentation room through establishing a network connection, receiving said presenting file and said playing control instruction, and executing a playing control operation to said presenting file in accordance with said playing control instruction at the receiver locally.

Wherein, said initiator is usually a mobile device having a playing material such as a presentation file and being ready to provide a uniform playing picture for sharing by other mobile devices, which is usually a mobile device of a conference host; and a receiver is usually a mobile device of a conference participant ready to receive picture data shared by said initiator. These mobile devices can be handheld devices such as smart phones, or other processing devices capable of playing a presentation file, wherein there is usually one initiator and one or more receivers. Said initiator plug-in 11 is installed in a mobile device of said initiator; said receiver plug-in 12 is installed in a mobile device of said receiver.

Said shared presentation room is a virtual presentation room established between more than two mobile devices via network interconnection within a certain range, which is set up by the device acting as the initiator and authorized by said initiator to allow participation of other devices. The initiator and receiver(s) in said shared presentation room can connected to each other in a point to multipoint network connection manner or a multipoint interconnect network connection manner.

Said initiator plug-in 11 can send invitation information of said shared presentation room to other mobile devices within a certain distance by means of network communication such as Wi-Fi. In an embodiment, invitation information of said shared presentation room includes an IP address of said initiator; and each of said receiver plug-ins 12 establishes a network connection with said initiator plug-in 11 in accordance with the IP address in said invitation information and joins in said shared presentation room.

Any mobile device within the coverage range of the invitation information of said shared presentation room can act as a receiver. Upon receiving invitation information sent by said initiator, a receiver can select to join in or not to join in said shared presentation room through a corresponding receiver plug-in 12. After the receiver plug-in 12 selects to join in said shared presentation room, the receiver plug-in 12 joins in the network interconnection of said shared presentation room through establishing a network connection and participates in the shared presenting.

In an embodiment, said initiator plug-in 11 can preset an authorization key of said shared presentation room when initiating said shared presentation room invitation, and require a receiver plug-in 12 intending to join in said shared presentation room to input the authorization key for confirmation.

Thus, said receiver plug-in 12 sends the authorization key of said shared presentation room to said initiator plug-in 11; said initiator plug-in 11 receives the authorization key sent by said receiver plug-in 12 and compares it with the preset authorization key of the shared presentation room, and makes a receiver plug-in 12 having a consistent authorization key to join into said shared presentation room.

By means of setting an authorization key, only when said receiver inputs a correct and consistent authorization key, this receiver is allowed to join in said shared presentation room. In this way, the confidentiality of the presenting content of the shared presentation room can be enhanced by preventing irrelevant people from joining in the shared presentation room to steal presenting content after receiving the invitation information.

In an embodiment, said initiator plug-in 11 can transmit said IP address or authorization key in the manner of Morse codes through sound. Thus, only a mobile device that has received said sound signal and has the capability of decoding Morse codes can access said shared presentation room. In this circumstance, said Morse code is a type of on-and-off signal code which indicates different alphabets, numbers and punctuations through different arranging sequences. It can prevent illegal access by people irrelevant to the conference and ensure the privacy of the conference.

Furthermore, after each of said receivers joins in said shared presentation room, said initiator plug-in 11 can create an address list including an IP address of said initiator and IP addresses of the receivers, said initiator plug-in 11 and each of said receiver plug-ins 12 can perform data transmission by searching for an address in said address list. By creating said address list, communication between the initiator and the receivers can be realized conveniently and communication among the receivers can be realized conveniently, too.

When sending said presenting file, said initiator plug-in 11 can send said presenting file to all of said receiver plug-ins 12 that have joined in said shared presentation room simultaneously in a broadcast manner; or send said presenting file to each of said receiver plug-ins 12 through a network connection established with each of said receivers respectively.

Wherein said playing control instruction is preferably identical with a local operation of said initiator.

That is, said initiator plug-in 11 generates a corresponding playing control instruction in accordance with a playing control operation performed to said presenting file at the initiator locally and sends said playing control instruction to said receiver plug-ins 12 that have joined said shared presentation room.

Thus, each of the receivers can execute a completely identical operation with said initiator in accordance with said playing control instruction, thereby realizing synchronization of operation.

After receiving said presenting file sent by said initiator plug-in 11, each of said receiver plug-ins 12 that has joined in said shared presentation room stores said presenting file locally, opens said presenting file locally with a corresponding application program and executes a corresponding playing control operation to said presenting file in accordance with said received playing control instruction, so that an initiator can control a plurality of receivers to play a uniform presenting file.

Since the presenting file per se is sent, each of the receivers has actually obtained said presenting file and can store said presenting file. Transmission of said presenting file is required only once. After the receivers have received said presenting file, only a playing control instruction of a small amount of data needs to be sent to each of the receivers in the presenting course, and each of the receivers executes a corresponding operation in accordance with said playing control instruction, thereby greatly reducing the amount of data transmitted during the presenting course.

As compared with the prior art, the shared presenting system of the present invention can control a playing control operation performed to a presentation file by each receiver through setting up a shared presentation room among a plurality of mobile devices via a network, wherein an initiator sends a presenting file and a playing control instruction for said presenting file to a receiver plug-in that has joined in said shared presentation room, which is of great convenience.

As a preferred embodiment, said receiver plug-in 12, upon detecting a marking operation to said presenting file at the receiver locally, sends information of said marking operation to said initiator plug-in 11.

Said initiator plug-in 11 further executes a marking operation to said presenting file in accordance with a local marking operation by the initiator or the received information of marking operation sent by said receiver plug-in 12, generates a corresponding marking operation instruction, and sends said marking operation instruction to the receiver plug-ins 12 that have joined in said shared presentation room.

Each of said receiver plug-ins 12 receives said marking operation instruction and executes a marking operation to said presenting file.

Wherein, the user of said initiator or the user of said receiver can execute a marking operation in the local device at the initiator or the local device of the receiver by using various touch-sensitive systems or a laser pointer, etc.

That is, if the receiver detects a marking operation by a local user when playing said presenting file, the receiver sends information of said marking operation to said initiator. Said receiver plug-in 12 can calculate a position of said marking operation in said presenting file based on a position of said marking operation and a position of said presenting file that is locally played, and then send said position and a type of said marking operation together to said initiator. In this circumstance, the type of the marking operation can be known editing and marking operations to a file, such as drawing a straight line, a curve, adding bold or italic etc.

Said initiator plug-in 11, upon receiving said marking operation or upon detecting a local marking operation at the initiator, executes a corresponding marking operation to said presenting file in accordance with the position and type of said marking operation, generates a corresponding marking operation instruction and sends said marking operation instruction to said receiver plug-ins 12 that have joined in said shared presentation room.

Each of the receiver plug-ins 12 receives said marking operation instruction, executes a marking operation to said presenting file and adds a corresponding mark into said presenting file. Adding of said marking operation can be performed in the revise mode, or said marking operation is added into said presenting file in the form of a comment.

Preferably, said initiator plug-in 11 further adds an identifier of the device that has initiated said marking operation in said marking operation instruction. Said initiator plug-in 11 and each of the receiver plug-ins 12 further execute a marking operation to said presenting file with different colors in accordance with different device identifiers when executing a marking operation to said presenting file so as to clearly distinguish markings of different operators via marks of different colors.

With the shared presenting system of the present invention, marking information of operators can be shared when sharing a playing file. When an operator of said initiator or receivers needs to perform marking to the current presenting file and wishes to show the marking to other participants, he/she can easily share said marking operation between said initiator and said receivers. Since each of the receivers performs marking to the presenting file respectively, said marking can be stored by the receivers at the end of the presenting to facilitate reviewing by users of the receivers.

As another preferred embodiment, said initiator plug-in 11 further sends a synchronization signal to said receiver plug-ins 12 that have joined in said shared presentation room; each of the receiver plug-ins 12 receives said synchronization signal and executes a playing control operation to said presenting file synchronously in accordance with said synchronization signal.

Through said synchronization signal, said initiator and said receivers can execute the corresponding playing control operation synchronously, thereby avoiding the problem of playing out-of-sync among the mobile devices of said shared presentation room caused by instruction transmission and delay.

The aforesaid embodiments only describe a few embodiments of the present invention with specific and detailed depiction, but the embodiment shall not be understood as limitation for the scope of patent protection of the present invention. It should be pointed out that those skilled in the art can make various transformation and improvements without departing from the inventive concept of the present invention, which shall all fall within the scope of protection of the present invention. Therefore, the scope of protection of the present invention shall be defined by the pending claims.

The invention claimed is:

1. A shared presenting method for mobile devices of participants in a conference, in which:
   an initiator sets up a shared presentation room and sends invitation information of said shared presentation room via a network, wherein said initiator is a mobile device providing a presentation file to share with other mobile devices, said shared presentation room is a virtual presentation room established between two or more mobile devices via a network interconnection within a certain range;
   a receiver(s) that has received said invitation information joins in said shared presentation room through establishing a network connection, wherein any mobile device within the coverage range of the invitation information of said shared presentation room can act as a receiver;
   said initiator sends a presenting file and a playing control instruction for said presenting file to said receiver(s) that has joined in said shared presentation room;
   said receiver(s) receives said presenting file and said playing control instruction, and locally executes a playing control operation to said presenting file in accordance with said playing control instruction;
   wherein step of joining in said shared presentation room comprises:
   said receiver(s) sending an authorization key of said shared presentation room to said initiator; said initiator receiving said authorization key sent by said receiver(s), comparing it with a preset authorization key and making the receiver(s) having a consistent authorization key to join in said shared presentation room; and wherein said initiator transmits the authorization key in the manner of Morse codes through sound using the speaker of the initiator mobile device without engaging any network, and only a mobile device within the propagation range of audible sound that has received said sound signal via its microphone and has the capability of decoding Morse codes can access said shared presentation room, and
   in which the invitation information sent by said initiator comprises an IP address of said initiator; and
   in the step that the receiver(s) that has received said invitation information joins in said shared presentation room through establishing a network connection,
   said receiver(s) establishes a network connection with said initiator in accordance with the IP address in said invitation information and joins in said shared presentation room; and
   in which said initiator further sends a synchronization signal to said receiver(s) that has joined in said shared presentation room;
   each receiver receives said synchronization signal and executes a playing control operation to said presenting file synchronously in accordance with said synchronization signal.

2. The shared presenting method according to claim 1, in which, in said step that said initiator sends a presenting file and a playing control instruction for said presenting file to said receiver(s) that has joined in said shared presentation room,
   said initiator generates a corresponding playing control instruction in accordance with a local playing control operation to said presenting file, and sends said corresponding playing control instruction to said receiver(s) that has joined in said shared presentation room.

3. The shared presenting method according to claim 2, in which:
   said receiver(s), upon detecting a local marking operation to said presenting file, sends information of said marking operation to said initiator;
   said initiator further executes a marking operation to said presenting file in accordance with the local marking operation at the initiator or said received marking operation information sent by said receiver(s), generates a corresponding marking operation instruction, and sends said marking operation instruction to said receiver(s) that has joined in said shared presentation room;
   each receiver receives said marking operation instruction and executes a marking operation to said presenting file.

4. The shared presenting method according to claim 3, in which said marking operation instruction further comprises an identifier of the device that initiates said marking operation; and
   further executes a marking operation to said presenting file with a different color in accordance with a different device identifier when executing a marking operation to said presenting file.

5. A shared presenting system for mobile devices of participants in a conference, comprising an initiator plug-in and a receiver plug-in(s); in which
   said initiator plug-in is used for setting up a shared presentation room, sending invitation information of said shared presentation room via a network and sending a presenting file and a playing control instruction for said presenting file to the receiver plug-in(s) that has joined in said shared presentation room, wherein an initiator is a mobile device providing a presentation file to share with other mobile devices, said initiator plug-in is installed in the initiator mobile device, said shared presentation room is a virtual presentation room established between two or more mobile devices via a network interconnection within a certain range;
   said receiver plug-in(s) is used for receiving said invitation information, joining in said shared presentation room through establishing a network connection, receiving said presenting file and said playing control instruction, and executing a playing control operation to said presenting file in accordance with said playing control instruction at the receiver locally, wherein any mobile device within the coverage range of the invitation information of said shared presentation room can act as a receiver and the receiver plug-in(s) is installed in the receiver mobile device;
   wherein, said initiator plug-in presets an authorization key of said shared presentation room when initiating said shared presentation room invitation, and requires a receiver plug-in intending to join in said shared presentation room to input the authorization key for confirmation; said receiver plug-in sends the authorization key of said shared presentation room to said initiator plug-in; said initiator plug-in receives the authorization key sent by said receiver plug-in and compares it with the preset authorization key of the shared presentation room, and makes a receiver plug-in having a consistent authorization key to join into said shared presentation room; and wherein said initiator plug-in transmits said authorization key in the manner of Morse codes through sound using the speaker of the initiator mobile device without engaging any network, and only a mobile device within the propagation range of audible sound that has received said sound signal via its microphone and has the capability of decoding Morse codes can access said shared presentation room, and in which the invitation information sent by said initiator comprises an IP address of said initiator; and in the step that the receiver(s) that has received said invitation information joins in said shared presentation room through establishing a network connection, said receiver(s) establishes a network connection with said initiator in accordance with the IP address in said invitation information and joins in said shared presentation room; and in which said initiator further sends a synchronization signal to said receiver(s) that has joined in said shared presentation room;

each receiver receives said synchronization signal and executes a playing control operation to said presenting file synchronously in accordance with said synchronization signal.

6. The shared presenting system according to claim 5, in which said initiator plug-in generates a corresponding playing control instruction in accordance with a local playing control operation at the initiator locally and sends said playing control instruction to said receiver plug-in(s) that has joined in said shared presentation room.

7. The shared presenting system according to claim 6, in which said receiver plug-in(s) is further used for, upon detecting a local marking operation to said presenting file at the receiver, sending information of said marking operation to said initiator plug-in; receiving a marking operation instruction sent by said initiator plug-in and executing a marking operation to said presenting file;

said initiator plug-in is further used for executing a marking operation to said presenting file in accordance with the local marking operation at the initiator or the received marking operation information sent by said receiver plug-in(s); generating a corresponding marking operation instruction and sending said marking operation instruction to said receiver plug-in(s) that has joined in said shared presentation room.

* * * * *